United States Patent
Koller et al.

[11] 3,987,026
[45] Oct. 19, 1976

[54] TRANSIENTLY WATER-SOLUBLE NON-HETEROCYCLIC AZO AND DISAZO DISPERSE DYESTUFFS

[75] Inventors: Stefan Koller, Ramlinsburg; Peter Aeschlimann, Allschwil; Hans Scheidegger, Binningen, all of Switzerland

[73] Assignee: Ciba-Geigy Corporation, Ardsley, N.Y.

[22] Filed: July 25, 1973

[21] Appl. No.: 382,635

[30] Foreign Application Priority Data
Aug. 3, 1972 Switzerland.................. 11519/72

[52] U.S. Cl................................ 260/205; 260/155; 260/156; 260/157; 260/158; 260/163; 260/174; 260/184; 260/186; 260/187; 260/206; 260/207; 260/207.1; 260/371; 260/377; 260/378; 260/465 D; 260/465 L; 260/507 R; 260/570.5 S

[51] Int. Cl.².................. C09B 29/08; C09B 29/36; C09B 31/04; D06P 3/52

[58] Field of Search ........... 260/151, 163, 162, 199, 260/152, 205, 207.1

[56] References Cited
UNITED STATES PATENTS
3,519,642   7/1970   Wedemeyer et al............ 260/163 X

*Primary Examiner*—Floyd D. Higel
*Attorney, Agent, or Firm*—Joseph G. Kolodny; Edward McC. Roberts; Prabodh I. Almaula

[57] ABSTRACT

Transiently water-soluble dyestuffs of the formula

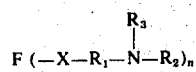

wherein F is a radical of a non-heterocyclic azo disperse dyestuff containing no groups which dissociate in water, $n$ is 1 or 2, X is an electrophilic group, $R_1$ is an optionally substituted ethylene group, and $R_2$ and $R_3$ are alkyl radicals which are different from each other and which carry altogether at least one water-solubilizing group and optionally still further substituents which do not impart solubility in water and $R_3$ can furthermore be a hydrogen atom. The dyestuffs can be dissolved in aqueous dyeing baths and dye polyester fibers in yellow, red and blue shades of good fastness.

19 Claims, No Drawings

TRANSIENTLY WATER-SOLUBLE NON-HETEROCYCLIC AZO AND DISAZO DISPERSE DYESTUFFS

The invention relates to transiently water-soluble disperse dyestuffs, their manufacture, and their use for dyeing and printing hydrophobic, synthetic organic material, especially polyester material.

It is common knowledge that hydrophobic, synthetic organic material, especially polyester material, is dyed with disperse dyestuffs such as are described, for example, in the Colour Index. The dyestuffs in question are coloured organic compounds which do not contain water-solubilising groups, for example sulphonic acid or ammonium groups, and are only soluble in water in traces and become attached to the material via a molecularly dispersed dissolved phase. To this end the disperse dyestuffs must be very finely ground before the actual dyeing process and stabilised in the aqueous dyebath by the addition of large amounts of dispersing agents. During the dyeing process the dyestuff is in the form not of a solution, but of a dispersion.

In practice, this frequently gives rise to considerable difficulties, because these dyestuff dispersions are often unstable, in which case the dyestuff crystallises and this in turn leads to unlevel dyeings. In high temperature dyeing in particular, an unsatisfactory stability of the dispersion makes itself conspicuous through filtration symptoms on dense material, for example on cheeses and in beam dyeing. Further, the dispersing agents can lead to foaming in large scale apparatus and — since they are mostly poisonous — have a very adverse effect on the effluent. Difficulties also arise in the dyeing of blended fabrics, since water-soluble dyestuffs are often poorly compatible with the dispersing agents of the disperse dyestuffs.

Dyestuffs have now been found which permit these difficulties to be circumvented by dyeing hydrophobic, synthetic organic material in a weakly acid, neutral, or alkaline solution of transiently water-soluble disperse dyestuffs according to the invention, which contain a group that can be split off under the dyeing conditions and that carries at least one water-solubilising group.

The invention therefore provides dyestuffs of the formula

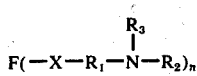

wherein F is a dyestuff of the disperse series, $n$ is 1 or 2, X is an electrophilic group, $R_1$ is an optionally substituted ethylene group, and $R_2$ and $R_3$ are alkyl radicals which are different from each other and which carry altogether at least one water-solubilising group and optionally still further substituents which do not impart solubility in water, and $R_3$ can furthermore be a hydrogen atom.

The new dyestuffs are obtained by reacting either (a) the dyestuffs of the formula $$F(-X-R_1-Z)_n$$

wherein $R_1$, F, and X have the same meanings as hereinabove and Z represents a labile acyl group of a strong acid, for example sulphuric acid or, in particular, of one of the hydrohalic acids, with n moles of the amine of the formula

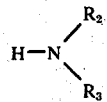

wherein $R_2$ and $R_3$ have the same meanings as hereinbefore, and whereby n moles of the acid H — Z escape, or (b) by addition of n moles of the amine of the formula

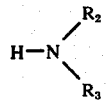

to the activated double bond in the dyestuff of the formula

wherein $n$, X, and F have the same meanings as hereinabove, or (c) by coupling the diazonium compound of a diazo component with a coupling component, at least one of the components containing the radical of the formula

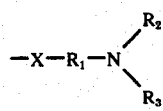

wherein X, $R_1$, $R_2$, and $R_3$ have the same meanings as hereinabove, or (d) by condensation of two components whose combination yields the dyestuff and which together contain at least one group of the formula

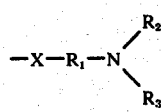

Suitable radicals X are divalent, electropositive groups with positive Hammet sigma para values of more than + 0.10, preferably of at least +0.30.

Examples of such groups are those of the formula

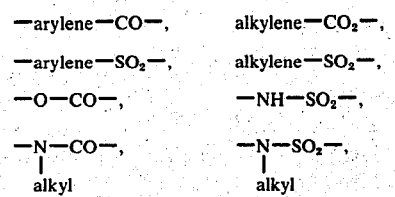

and simply $-SO_2-$ or $-CO-$, the group $R_1$ being added on to the right hand side of each of the above formulae.

$R_1$ is an ethylene group optionally containing substituents which do not dissociate in water, in particular a 1,2-propylene or ethylene radical. $R_2$ and $R_3$ are alkyl groups which are different from each other with 1 to 8 carbon atoms, especially 1 to 4 carbon atoms, which together possess at least one water-solubilising group, for example —SO₃—H, —OSO₃H, —OPO₃H₂ groups.

Examples of suitable groups are those of the formulae

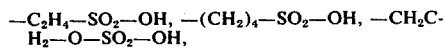

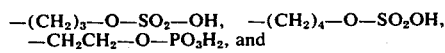

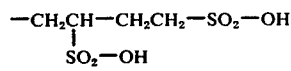

Radicals of the formula

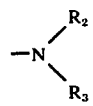

are, for example, those of the following formulae:

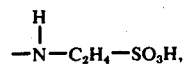

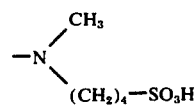

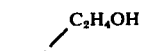

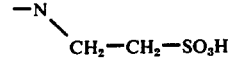

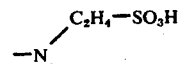

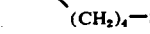

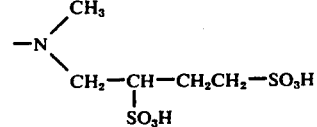

and above all the group of the formula

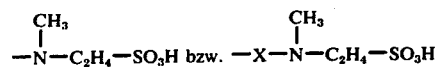

The disperse dyestuffs F can belong to any suitable class of dyestuff. They are, for example, mono- or polyazo dyestuffs which optionally contain metal, among which also formazane dyestuffs are classed, anthraquinone dyestuffs, nitro, methone, styryl, naphthoperinone and quinonaphthalone dyestuffs. Metal-free azo and anthraquinone dyestuffs are preferred

Azo dyestuffs

To the particularly interesting dyestuffs belong the azo dyestuffs of the formula

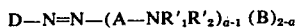

wherein D is the radical of a diazo component, A is an arylene radical, in particular an optionally substituted 1,4-phenylene radical, $a=1$ or 2, $R'_1$ and $R'_2$ each represents an optionally substituted alkyl group, and B is the radical of a coupling component, for example a phenol, an enol, an aminopyrazole, a cyanopyridone, or a pyrazolone, and at least one of the radicals D, A, $R'_1$, $R'_2$, and B contains a group of the formula

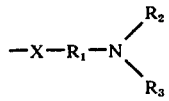

wherein X, $R_1$, $R_2$, and $R_3$ have the same meanings as hereinbefore.

To these dyestuffs belong the dyestuffs which contain only one group of the formula — X — $R_1$ — $NR_2R_3$, of the formulae 1. 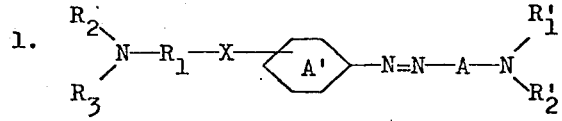

wherein the ring A' can contain yet further groups that do not impart solubility in water, 2. 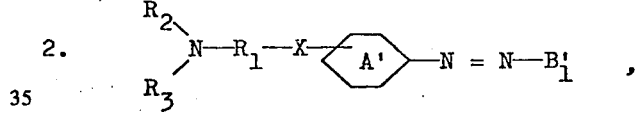

wherein B' is a radical of a coupling component of the phenol, enol, aminopyrazole, pyrazolone, or cyanopyridone series, and the aromatic ring A' can contain as substituents in addition lower alkyl groups or alkoxy groups, halogen atoms, nitro, cyano, lower alkylsulphonyl, or sulphamide groups, 3. 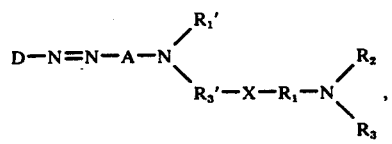

wherein $R'_1$ is in turn an optionally substituted alkylene group, and $R'_3$ is an alkylene group which is optionally interrupted by heteroatoms, in particular oxygen atoms, 4. 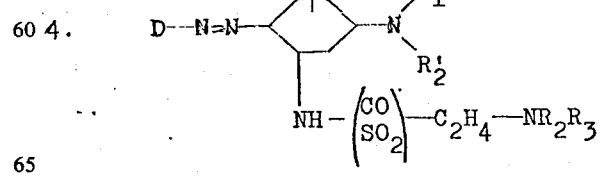

wherein $d$ has the meaning given hereinbelow.

Examples of dyestuffs belonging to dyestuffs cited under (1) are those of the formula

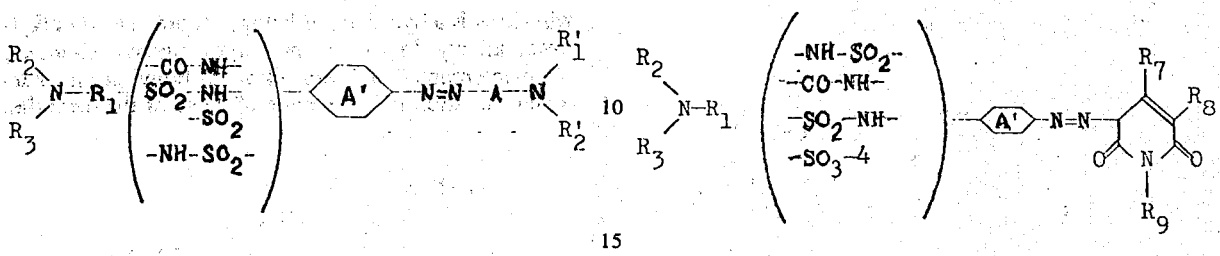

wherein the ring A' can be further substituted, and A, A', $R_1$, $R_2$, $R'_1$ and $R'_2$ have the same meanings as hereinbefore.

Examples of dyestuffs belonging to the dyestuffs cited under (2) are those of the formula

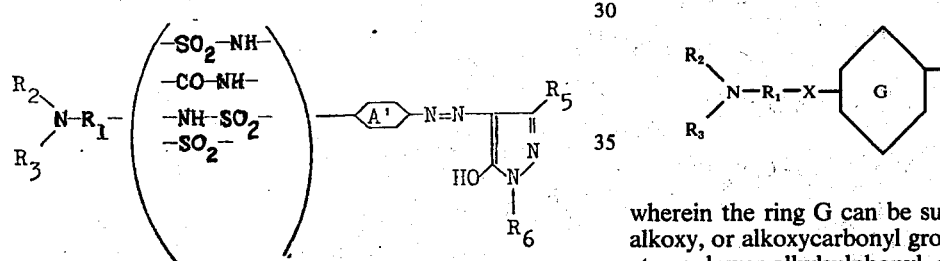

wherein $R_5$ is a lower alkyl or alkoxy group, a phenyl group, a lower alkoxycarbonyl group or an optionally lower alkylated aminocarbonyl group, and $R_6$ is a hydrogen atom, an optionally substituted alkyl or aryl group or a sulpholane radical;

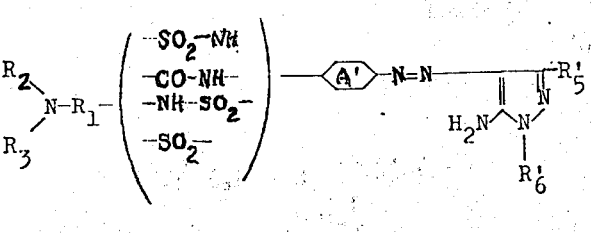

wherein $R'_5$ is a lower alkyl, lower alkoxy or phenyl group and $R'_6=R'_6$;

wherein $R_9$ is a hydrogen atom, an alkyl group, or an aryl group, $R_8$ is an acyl group, a substituted, preferably alkylated, aminocarbonyl group, or preferably a cyano group, $R_7$ is an optionally substituted alkyl or aryl group, for example a phenyl group which is substituted with chlorine or bromine atoms, methyl, ethyl, methoxy, ethoxy, nitro, hydroxy, trifluoromethyl, acyloxy or acylamino groups.

Preferred dyestuffs are further those in which the diazo component corresponds to the formula

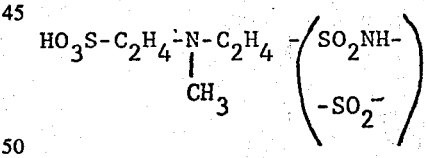

wherein the ring G can be substituted by lower alkyl, alkoxy, or alkoxycarbonyl groups, chlorine or bromine atoms, lower alkylsulphonyl, nitro or cyano groups.

Valuable subgroups of dyestuffs are those of the formula

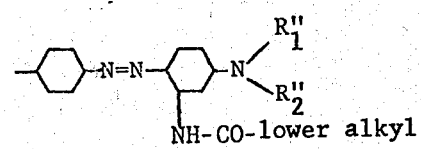

wherein $R''_1$ and $R''_2$ are the same or different and represent lower alkyl, phenylethyl, benzyl, cyanoethyl, hydroxy-lower alkyl, lower alkyloxycarbonyl-lower alkyl groups or cyanoethoxyethyl groups, in particular those of the formula

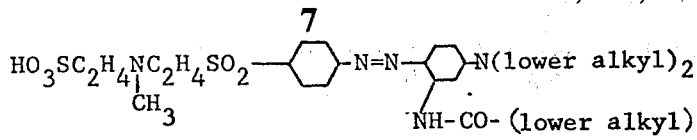

also the dyestuffs of the formula

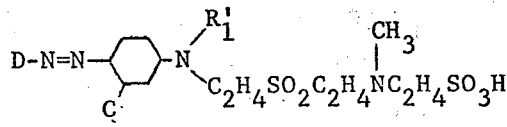

wherein c represents a hydrogen atom or a halogen atom or an acyl group of a lower monocarboxylic acid, and R'₁ is the same as hereinbefore, and c is also a hydrogen atom or a methyl group and R₁ is a lower, unsubstituted alkyl group, and R'₁ is preferably a phenylethyl, benzyl, cyanoethyl, cyanoethoxyethyl, hydroxy-lower alkyl or lower alkylcarbonyloxy-lower alkyl group, but with particular advantage is a lower alkyl group.

To these belong the dyestuff group of the formulae

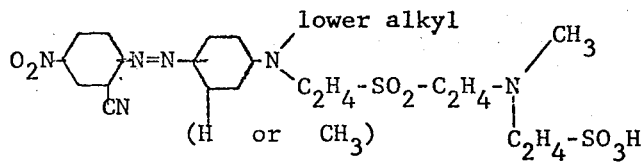

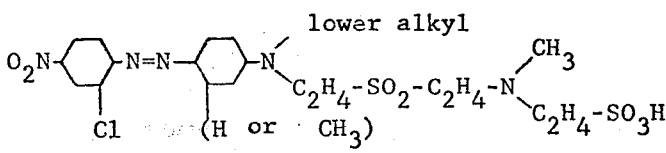

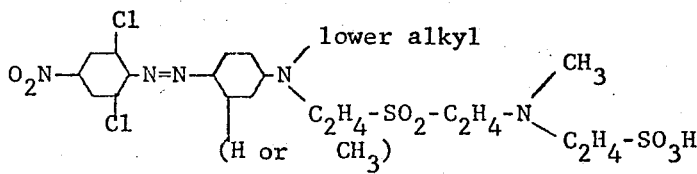

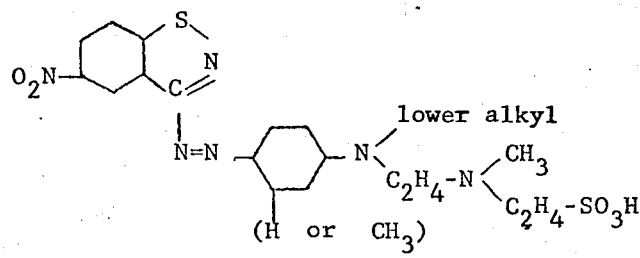

which can, of course, also contain diazo radicals D other than those cited hereinabove.

Of the dyestuffs of the formula

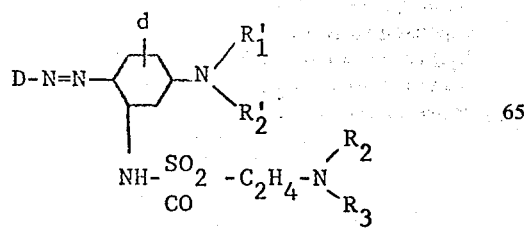

wherein d is a hydrogen or halogen atom, a lower alkyl, lower alkoxy, lower alkylmercapto, phenyl, phenoxy, phenylmercapto, or lower alkoxycarbonyl group, particular mention is to be made of those of the formulae

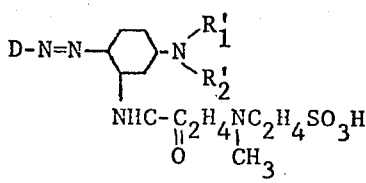

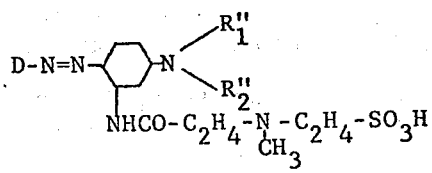

wherein R''₁ and R''₂ have the same meanings as hereinbefore, and

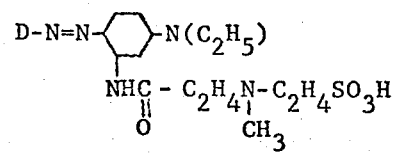

In this last case, D is advantageously a 2-chloronitrophenyl or 2-cyanonitrophenyl radical.

Of the dyestuffs containing a pyrazole radical particular mention is to be made of those of the formulae

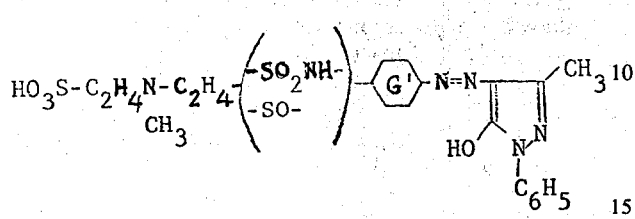

and

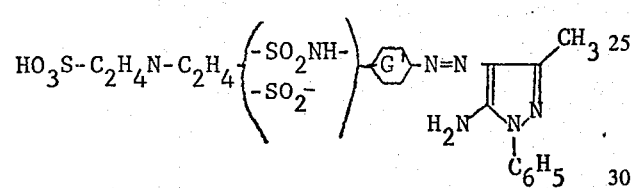

wherein G' is preferably unsubstituted.

In the dyestuffs of the group 3, the group A is preferably the radical of the formula

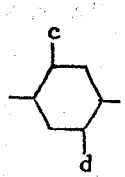

wherein c and d are hydrogen atoms, chlorine atoms, lower alkyl groups, for example methyl, ethyl, lower alkoxy groups, for example methoxy, ethoxy, phenylthio, phenoxy, or lower alkoxycarbonyl groups. Unless otherwise stated, lower alkyl, lower alkoxy, lower alkyloxycarbonyl groups etc. are unsubstituted groups with 1 to 5 carbon atoms, and this also applies in the remainder of the description.

The group c is preferably bonded in ortho-position to the azo group and in addition to the groups cited hereinabove can also represent a bromine atom, a trifluoromethyl group, and an acylamino group which is optionally alkylated, preferably methylated, at the nitrogen atom, in which group the acyl radical is the radical of an organic monocarboxylic acid, an organic monosulphonic acid, for example methanesulphonic, ethanesulphonic, or p-toluenesulphonic acid, or the radical of a carbamic acid or of a carbonic acid monoester, for example a lower alkoxycarbonyl, phenoxycarbonyl, lower alkylaminocarbonyl, or phenylaminocarbonyl radical.

The groups $R'_1$ and $R'_2$ can be hydrogen atoms or lower alkyl groups, i.e. which contain 1 to 4, preferably 2 to 4, carbon atoms, for example methyl, ethyl, n-propyl, or n-butyl groups which can be interrupted by oxygen atoms and/or substituted in the customary manner. Suitable substituents are: halogen atoms, preferably fluorine, chlorine or bromine atoms, lower alkoxy, lower alkylcarbonyloxy, lower alkylcarbonylamino, benzoyloxy, benzoylamino, cyano, hydroxy, lower alkylsulphonyloxy, phenylsulphonyloxy, toluenesulphonyloxy, lower alkylsulphonyl, lower alkoxycarbonyloxy, lower alkylaminocarbonyloxy, phenoxycarbonyloxy, phenylaminocarbonyloxy groups, and groups of the formulae

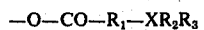

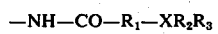

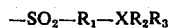

Among the azo dyestuffs mention is also to be made of disazo dyestuffs which correspond preferably to the formula

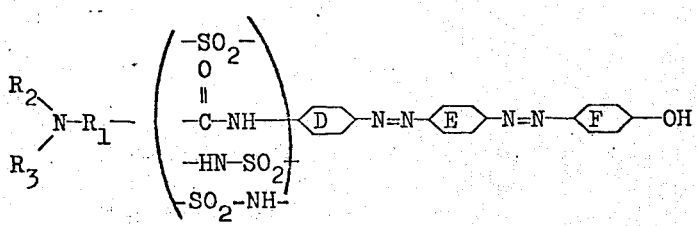

wherein the ring D can additionally carry halogen or alkyl groups, the rings E and F alkyl and/or alkoxy groups, and the ring E can also carry a nitro group.

Styryl dyestuffs

Preferred styryl dyestuffs are those of the formula

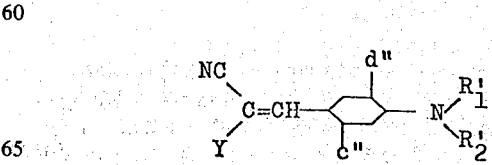

wherein $c''$ and $d''$ are the same or different and represent hydrogen atoms, lower alkyl or alkoxy groups, chlorine or bromine atoms, $R'_1$ and $R'_2$ have the same meaning as hereinbefore and Y is a cyano, carbalkoxy, arylsulphonyl, alkylsulphonyl, or optionally lower alkylated carboxylic acid amide group, and either the radical $R'_1$ contains a group of the formula

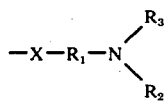

or Y represents a group of the formula

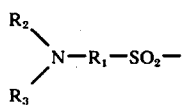

Examples of such styryl dyestuffs which contain a group of the formula $-R_1-NR_2R_3$ are those of the formulae

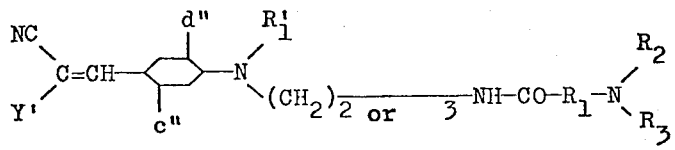

and

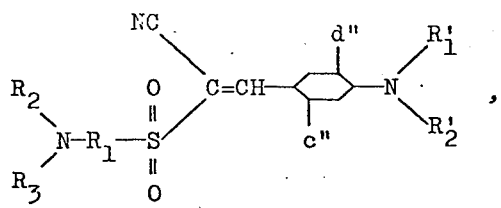

wherein Y' is a cyano, arylsulphonyl, optionally lower alkylated carboxylic amide or carbalkoxy radical and the symbols $c''$, $d''$, $R_1$, $R_2$, $R_3$, $R'_1$ and $R_2$ have the same meanings as hereinbefore.

Anthraquinoid dyestuffs

Dyestuffs according to the invention of the anthraquinone series are, for example, anthraquinone derivatives of the formula

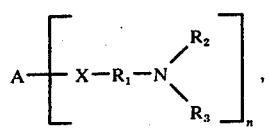

wherein $n$ is a whole number from 1 to 2, preferbly 1, X, $R_1$, $R_2$ and $R_3$ have the same meanings as hereinbefore, and Y represents an anthraquinoid radical with 3 to 5 condensed rings, which contain one or more other substituents, for example halogen atoms, e.g. fluorine, chlorine or bromine, hydroxy groups, alkoxy groups, amino groups, acylamino groups, alkylamino groups with 1 to 3 carbon attoms, acyloxy groups, optionally substituted aryl radicals, optionally substituted heterocyclic radicals, arylamino groups, in which the aryl radical is preferably a phenyl group which can be substituted by one or more halogen atoms or alkyl or alkoxy groups, alkyl or optionally substituted phenylsulphonyl groups, alkyl or optionally substituted phenylthioether radicals and nitro, cyano, carboxylic acid ester and acetyl groups. Examples of tetracyclic anthraquinone radicals are 1,9-isothiazolanthrone, 1,9-anthrapyrimidine, or 1,9-pyrazolanthrone. The alkyl radicals are preferably lower alkyl radicals which can contain up to 6 carbon atoms.

Examples of preferred anthraquinone dyestuffs are those of the formula

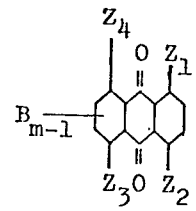

wherein B represents a halogen atom, in particular a bromine or chlorine atom, or an alkyl or alkoxy group, in particular methyl or methoxy, $m$ is 1 or 2, and $Z_1$, $Z_2$, $Z_3$ and $Z_4$ represent in each case a hydrogen atom, an amino or hydroxy group which is optionally substituted by an alkyl, aralkyl, cycloalkyl, aryl or heterocyclic radical, a nitro group or an amino or hydroxy group which is substituted by an organic acid radical, and one of the symbols $Z_1$, $Z_2$, $Z_3$ or $Z_4$ contains a group of the formula $$-NH-\text{hydrocarbon}\begin{pmatrix}-NH-CO\\-SO_2\end{pmatrix}-R_1-N\begin{matrix}R_2\\R_3\end{matrix}$$

Examples of other preferred anthraquinone dyestuffs are those of the formula wherein $Z_2$, $Z_3$, $Z_4$, B and m have the same meaning as hereinbefore, and Y is a radical of the formulae $=N-NH-$, $=N-NR'_1$, $=N-CO-NR'''_1$, $=CH-CO-NR'_1$, or $=N-S-$ wherein R''' has the same meaning as hereinabove, but is preferably a methyl group.

Examples of further preferred anthraquinone dyestuffs are those of the formula

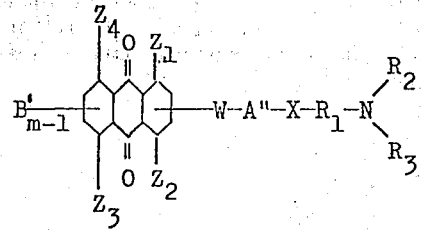

wherein $Z_1$, $Z_2$, $Z_3$, $Z_4$, B, m, X, $R_2$ and $R_3$ have the same meanings as given hereinbefore, A'' is an aliphatic, araliphatic, aromatic, or heterocyclic radical which is optionally interrupted or substituted by heteroatoms, and W is a direct bond, a sulphonyl, sulphonyloxy or sulphonylamino group or has the same meaning as that given for X. Particular interest attaches to the subgroup of these dyestuffs wherein the symbol W is a direct bond, the symbol B' is a chlorine or bromine atom, and the group A'' is a p-phenylene radical which can further carry alkoxy, hydroxy, phenoxy or acyloxy groups.

Dyestuffs of particular interest are those of the formulae

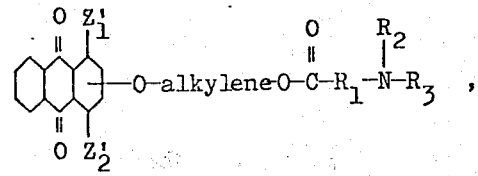

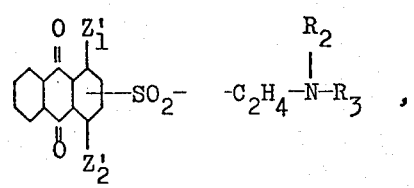

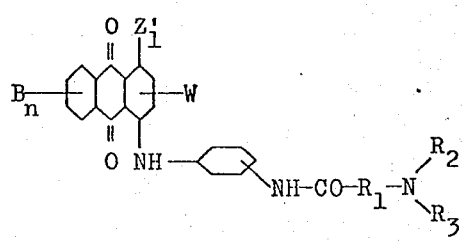

wherein $Z'_1$ and $Z'_a$ represent hydroxyl groups or amino groups optionally substituted with alkyl or aryl groups, W represents a hydrogen atom, a cyano, carbalkoxy, or carboxylic amido group or a halogen atom and B, n, $R_1$, $R_2$, and $R_3$ have the same meanings as hereinabove.

Suitable amines of the formula

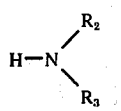

which can be used for the manufacture of the dyestuffs according to the invention in accordance with modification (a) or (b) have e.g. the following formulae

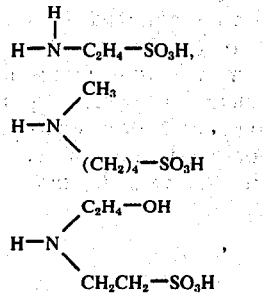

and, above all, the amine of the formula

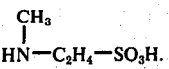

For simplicity's sake, most of the cations used for neutralising the negative charge in one of the radicals $R_2$ or $R_3$, especially the cations of the series of the alkali metals which do not lower the solubility, are not indicated herein.

The following compounds are examples of starting products of the formula $F-(X-R_1-Z)_n$ for the manufacture of water-soluble disperse dyestuffs according to the invention, of the formula

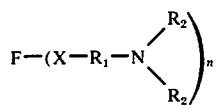

in accordance with reaction type (a):

$F-SO_2-CH_2CH_2-O-SO_3H$

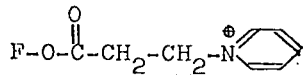

$F-O-CO-CH_2CH_2-Cl$,

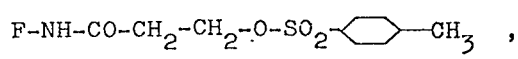

$F-NH-CO-CH_2-CH_2-Br$,
$F-NH-SO_2-CH_2-CH_2-Cl$.

These starting materials are obtained, for example, by sulphating dyestuffs containing the radical $-SO_2-CH_2CH_2OH$ in known manner with chlorosulphonic acid, sulphuric acid, or oleum, or by reacting disperse dyestuffs containing amino or hydroxyl groups with β-halocarboxylic acids or β-halosulphonic acid chlorides. Such dyestuffs are, for example, those of the formulae

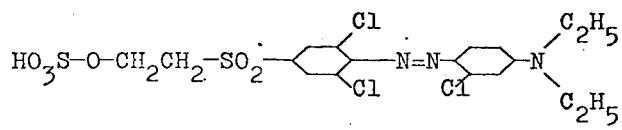

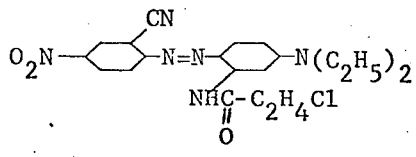

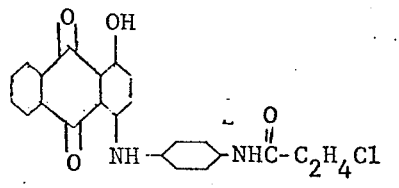

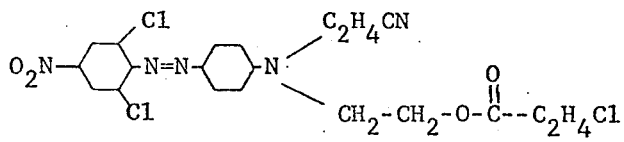

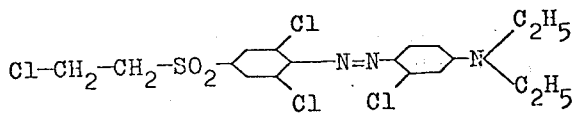

The reaction of the amines of the formula $HNR_2R_3$ with the dyestuff precursors of the formula $F-(X-R_1-Z)_n$ takes place with the application of heat at 30° to 180° C in the presence of acid acceptors which facilitate the escape of the acid $H-Z$. Suitable acid acceptors are alkali carbonates and alkali hydroxides.

The azo dyestuffs according to the invention can also be obtained by coupling a diazonium compound of an amine with a coupling component, in which case at least one of the components must contain a group of the formula

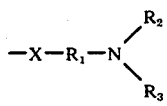

Suitable diazo components which contain the group of the formula

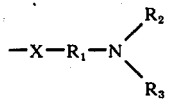

correspond, for example, to the formula

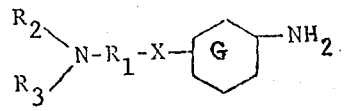

, wherein the ring G can be substituted by lower alkyl, alkoxy or alkoxycarbonyl groups, chlorine and bromine atoms, lower alkylsulphonyl, nitro or cyano groups. Particular examples are the anilines of the formulae

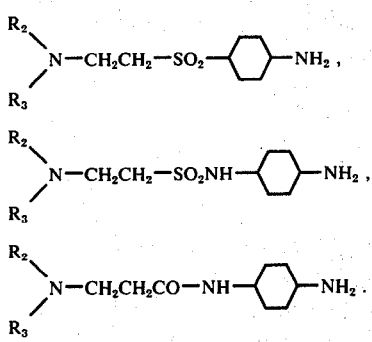

One example of such a diazo component is the amine of the formula

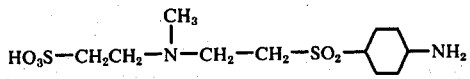

which is obtained by reaction of the amine of the formula

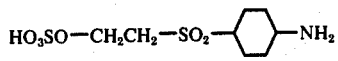

with N-methyl taurine. The other diazo components can be obtained in analogous manner.

As examples of aromatic diazo compounds without a radical of the formula

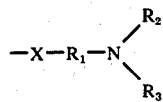

there may be cited those of the naphthalene and, in particular, of the benzene series. As substituents of the benzene ring there are to be mentioned above all halogen atoms, especially chlorine and bromine, nitro, cyano, thiocyano, trifluoromethyl, alkyl, alkoxy, aryloxy, alkylmercapto, arylmercapto, alkoxycarbonyl, aryloxycarbonyl, alkoxycarbonyloxy, aryloxycarbonyloxy, alkoxysulphonyl, aminosulphonyloxy, carboxylic acid amide, acyl and acylamino radicals, and also phenylazo groups, wherein the phenyl nucleus can be substituted with chlorine, nitro, alkyl, and alkoxy group substituents.

By "alkyl" and "alkoxy" are meant in this context low molecular radicals with 1 to 4 carbon atoms, preferably methyl and methoxy. The term "acyl" is to be understood as meaning radicals of aliphatic and aromatic carboxylic, sulphinic and sulphonic acids, in particular benzoyl (optionally substituted at the benzene nucleus), benzenesulphonyl, benzylsulphonyl radicals, as well as radicals of alkylsulphonic acids containing at most 4 carbon atoms, and aliphatic carboxylic acids. The sulphonic and carboxylic amide groups, as well as the aminosulphonyloxy radicals, can carry one or two alkyl groups at the nitrogen, which alkyl groups can also be joined to a ring.

Such aminobenzenes can be substituted, e.g. in accordance with the following schematic formula

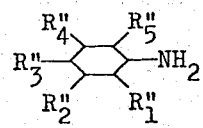

wherein $R''_1$ is hydrogen, bromine, a thiocyano, alkoxysulphonyl, alkoxycarbonyl, hydroxy, alkylmercapto, arylmercapto, alkoxycarbonyloxy, aminosulphonyloxy, acylamino group or preferably chlorine, a nitro, cyano, acyl, sulphonamide, carboxylic amide, alkoxy or aryloxy group; $R''_2$ is bromine, a carboxylic acid amide, alkoxycarbonyl group or preferably is hydrogen; $R''_3$ is hydrogen, bromine, chlorine, a thiocyano, alkoxycarbonyl, alkoxy, aryloxy or acylamino group, or is preferably a nitro, cyano, acyl, sulphonamide, carboxylic amide, trifluoromethyl or phenylazo group, the phenyl nucleus of which can be substituted with alkyl, alkoxy, nitro groups and chlorine; $R''_4$ is bromine, a nitro, cyano, thiocyano, acyl, carboxylic amide, alkoxy, aryloxy or acylamino group, chlorine, a sulphonamide, alkoxycarbonyl, trifluoromethyl or alkyl group, or is preferably hydrogen; $R''_5$ is in particular hydrogen, chlorine or bromine a nitro, cyano, thiocyano, acyl, alkoxycarbonyl, trifluoromethyl or alkyl group.

The terms "acyl", "alkyl" and "alkoxy" have the same meanings as stated hereinbefore.

Examples of such acyl radicals are: benzoyl, 4-chlorobenzoyl, 4-methylbenzoyl, benzenesulphonyl, acetyl, propionyl, chloroacetyl or methylsulphonyl radicals.

It is further to be considered that 2 strong electron acceptors, i.e. electrophilic substituents such as nitro or acyl groups, may never be in the ortho-position to each other. On the other hand, this is possible in the case of halogen atoms, cyano, and alkoxycarbonyl groups. Preferably hydroxy, alkoxy and alkyl groups or halogen atoms are in ortho-position to electron acceptors.

Amongst the diazo components of the benzene series the following may for example be mentioned: aniline, 1-amino-3- or -4-chlorobenzene, 1-amino-4-bromobenzene, 1-amino-2-, -3- or -4-methylbenzene, 1-amino-2-, -3- or -4-nitrobenzene, 1-amino-4-cyanobenzene, 1-aminobenzene-3- or -4methylsulphone, 1-amino-2-chlorobenzene-4-methylsulphone, 1-amino-2,5-dicyanobenzene, 1-amino-4-carbethoxybenzene, 1-amino-2,4- or -2,5-dichlorobenzene, 1-amino-2,4-dibromobenzene, 1-amino-2-methyl-4- or -6-chlorobenzene, 1-amino-2-trifluoromethyl-4-chlorobenzene, 1-amino-2-cyano-4-chlorobenzene, 1-amino-2-cyano-4-nitrobenzene, 1-amino-2-carbomethoxy-4-chlorobenzene, 1-amino-2-methanesulphonyl-4chlorobenzene, 1-amino-2-carbomethoxy-4-nitrobenzene, 1-amino-2-phenoxy-4-nitrobenzene, 1-amino-2-chloro-4-cyanobenzene, 1-amino-2-chloro-4-nitrobenzene, 1-amino-2-methoxy-4-nitrobenzene, 1-amino-2-chloro-4-carbethoxybenzene, 1-amino-2,4-dinitrobenzene, 1-amino-2,4-dicyanobenzene, 1-amino-2,6-dichloro-4-cyanobenzene, 1-amino-2,6-dichloro-4-nitrobenzene, 1-amino-2,5- or -2,6-dichlorobenzene-4-sulphonic acid dimethylamide, 1-amino-2-chlorobenzene-4-sulphonic acid dimethylamide, 1-amino-2,6-dibromobenzene-4- sulphonic acid amide, 1-amino-2,4-dinitro-6-chloro- or -6-bromobenzene, 1-amino-2,4-dicyano-6-chlorobenzene, 1-amino-2,4,6-trichloro- or -tribromobenzene, 1-aminobenzene-3- or -4-sulphonic acid amide, 1-aminobenzene-3- or -4-sulphonic acid N-methyl- or diethyl-amide, 4aminoazobenzene, 4-amino-2′-chlorazobenzene, 4-amino-2′,4′-dichlorazobenzene, 4-amino-3′-chloro-azobenzene, 4-amino-2′-nitroazobenzene, 1-amino-4-nitrobenzene-2-methylsulphone, 1-aminobenzene-4-carboxylic acid β-methoxyethyl ester, 4-amino-3-nitro-azobenzene, 4-amino-3′-nitro-azobenzene, 4-amino-2-methylazobenzene, 4-amino-4′-methoxy-azobenzene, 4-amino-3-nitro-2′-chlor-azobenzene, 4-amino-3-nitro-4′chlor-azobenzene, 4-amino-3-nitro-2′,4′dichlor-azobenzene, 4-amino-3-nitro-4′-methoxyazobenzene, 4-aminodiphenyl and 2- or 4-aminodiphenylether.

Suitable diazo components are also any kind of diazotisable heterocyclic amines which do not contain any acid water-solubilising groups. These amines derive e.g. from the thiazole, benzthiazole, naphthothiazole, isothiazole, benzisothiazole, imidazole, benzimidazole, thiadiazole, pyridine, quinoline, indazole, selenazole, oxazole, oxidazole, benzoxazole, pyrazole, or triazole series.

Possible substituents of these amines are: phenyl and phenylazo groups, wherein the phenyl rings can carry still further substituents, e.g. chlorine, nitro, alkyl, alkoxy, and alkylmercapto radicals, each with 1 to 4 carbon atoms, halogen, especially bromine and chlorine, sulphamoyl, trifluoromethyl, cyano, thiocyano, nitro, aralkyl, in particular benzyl, cycloalkyl, in particular cyclohexyl cyclohexyl radicals and also alkyl, alkoxy, alkylmercapto, alkylsulphonyl, alkoxycarbonyl, alkanoyl, and N,N-dialkylsulphonamide groups, especially those radicals with 1 to 4 carbon atoms.

Preferred amines are those which possess a heterocyclic 5-membered ring with 2 or 3 heteroatoms, chiefly with one nitrogen atom and one or two sulphur, oxygen or nitrogen atoms as heteroatoms, i.e. especially the amines of the thiazole, benzthiazole, isothiazole, benzisothiazole and thiadiazole series.

Preferred substituents of these amines are: halogen, in particular chlorine or bromine, nitro, cyano, trifluoromethyl, alkyl, and alkoxycarbonyl radicals, each with 1 to 4 carbon atoms, phenyl, and the phenyl radicals cited hereinabove. Examples of such diazo components are:

The following may be mentioned as examples: 2-aminothiazole, 2-amino-5-nitrothiazole, 2-amino-5-methylsulphonyl-thiazole, 2-amino-5-cyanothiazole, 2-amino-4-methyl-5-nitrothiazole, 2-amino-4-methylthiazole, 2-amino-4-phenylthiazole, 2-amino-4-(4′-chloro)-phenylthiazole, 2-amino-4-(4′-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 3-amino-1-(4′-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-nitrobenzthiazole, 2-amino-6-carbethoxybenzthiazole, 2-amino-6-methylsulphonylbenzthiazole, 2-amino-1,3,4-thiadiazole, 2-amino-1,3,5-thiadiazole, 2-amino-4-phenyl- or -4-methyl-1,3,5-thiadiazole and 2-amino-5-phenyl-1,3,4-thiadiazole.

Particular mention is to be made of the diazo components of the formula

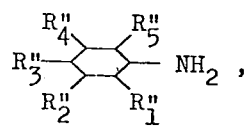

wherein $R''_1$, $R''_2$, $R''_3$, $R''_4$ or $R''_5$ represents a radical of the formula

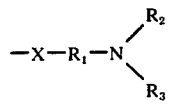

and the other radicals R'' have the same meaning as given hereinbefore.

Suitable coupling components which contain one or two groups of the formula

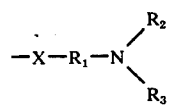

can be obtained by reaction of a coupling component with the group of the formula —X—$R_1$—Z and the amine of the formula

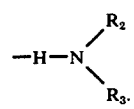

Examples of such starting products are those of the formulae

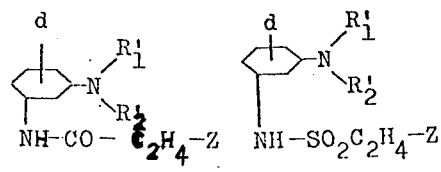

wherein c, d, $R'_1$, $R'_2$, $R'_3$, X, $R_1$ and Z have the same meanings as hereinbefore.

Coupling components with the group —$R_1$—$NR_2R_3$ correspond, for example, to the formulae

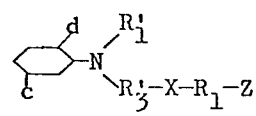

and

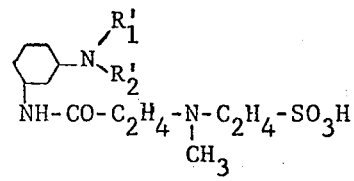

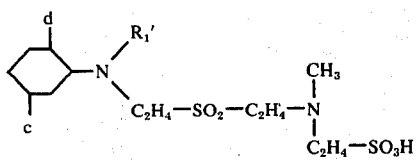

It is possible to obtain such coupling components, for example, by acylating corresponding coupling components which possess a free amino or hydroxyl group with β-bromo- or β-chloropropionic acid chloride Examples of such acylatable coupling components are:

N-β-hydroxyethyl-N-ethyl-aniline
N-β-aminopropyl-N-ethyl-aniline
N-β-hydroxyethyl-n-cyanoethyl-aniline
N,N-bis-β-hydroxyethyl-aniline
3-acetamino-6-methoxy-N,N-bis-β-hydroxyethyl-aniline
3-amino-N,N-diethyl-aniline
3-amino-N,N-bis-β-acetoxyethyl-aniline
3-amino-N,N-bis-β,β-cyanoethyl-aniline
1β-hydroxyethyl-3-methylpyrazolone-(5) and
1β-aminoethyl-3-methylpyrazolone-(5)

Suitable coupling components without the group of the formula

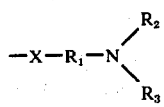

are the usual coupling components of the aniline, phenol, enol, or heterocyclic series.

Among the coupling components of the benzene series, there may be cited besides the phenols, e.g. m- or p-cresol, resorcinol, 1-hydroxy-4-cyanoethylbenzene, in particular the aminobenzenes, for example aniline, 3-methyl-aniline, 2-methoxy-5-methyl-aniline, 3-acetylamino-1-aminobenzene, N-methyl-aniline, N-β-hydroxyethyl-aniline, N-β-methoxyethyl-aniline, N-β-cyanoethylaniline, N-β-chloroethyl-aniline, dimethyl aniline, diethyl aniline, N-methyl-N-(benzyl- or β-phenylethyl)-aniline, N-n-butyl-N-β-chloroethyl-aniline, N-(methyl, ethyl, propyl or butyl)-N-β-cyanoethyl-aniline, N-methyl-N-β-hydroxyethyl-aniline, N-ethyl-N-β-chloroethyl-aniline, N-methyl-N-β-acetoxyethyl-aniline, N-ethyl-N-β-methoxyethyl-aniline, N-β-cyanoethyl-N-β- chloroethylaniline, N-β-cyanoethyl-N-(acetoxy- or benzoyloxyethyl)aniline, N,N-di-β-hydroxyethyl-aniline, N,N-di-β-acetoxyethyl-aniline, N-ethyl-N-2-hydroxy-3-chloropropyl-aniline, N,N-di-β-cyanoethylaniline, N,N-di-β-cyanoethyl-3-methyl-aniline, N-β-cyanoethyl-N-β-hydroxethyl-3-chloro-aniline, N,N-di-β-cyanoethyl-3-methoxy-aniline, N,N-di-ethyl-3-acetylamino-aniline, N-ethyl-N-β-cyanoethyl-3-acetylamino-aniline, N,N-di-β-cyanoethyl-2-methoxy-5-acetylamino-aniline, N-methyl-N-phenacyl-aniline, N-β-cyanoethyl-2-chlorodiphenyl amine, N-dimethyl-diphenylamine, N-methyl-4-ethoxy-diphenylamine, or N-phenylmorpholine, also e.g. amines of the formula

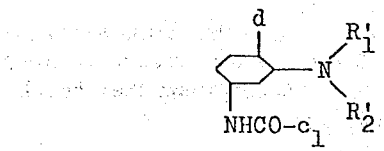

wherein $c_1$ represents a hydrogen atom, an optionally substituted alkyl, cycloalkyl, or alkoxy group or a benzene radical.

A further possibility of manufacturing the coupling components consist in the addition of the amines of the formula

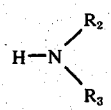

to vinyl compounds of the formula

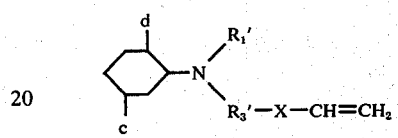

advantageously in alkaline medium.

Among the coupling components of the naphthalene series there may be cited, besides the naphthols, for example 1- or 2-naphthylamine and 2-phenylaminoaphthalene, 1-dimethylaminonaphthalene, or 2-ethylaminonaphthalene. From the series of the heterocyclic coupling components there may be cited for example the indoles, e.g. 2-methyl-indole, 2,5-dimethyl-indole, 2,4-dimethyl-7-methoxy-indole, 2-phenyl or 2-methyl-5ethoxyindole, N-β-cyanoethyl-2-methyl-indole, 2-methyl-5- or 6-chloroindole, 1,2-dimethyl-indol, 1-methyl-2-phenyl-indole, 2-methyl-5-nitro-dinole, 2-methyl-5-cyano-indole, 2-methyl-7-chloroindole, 2-methyl-5-fluoro- or -5-bromo-indole, 2-methyl-5,7-dichloro-indole or 2-phenyl-indole, 1-cyanoethyl-2,6-dimethylindole, pyridines, e.g. 3-cyano-2,6-dihydroxy-4-methyl-pyridine, also pyrazoles, e.g. 1-phenyl-3-methyl-5-amino-pyrazole or 3-methyl-pyrazolone-5- or 1-phenyl-3-methyl-pyrazolone-5, 1,3-dimethyl-pyrazolone-5, 1-butyl-3-methylpyrazolone-5, 1-oxyethyl-3-methyl-pyrazolone-5, 1 -cyanoethyl-3-methyl-pyrazolone-5,1-(o-chlorophenyl)-3-methyl-pyrazolone-5, 3-carbomethoxy-pyrazolone-5, quinolinos, e.g. 8-hydroxyquinoline, 1-methyl-4-hydroxyquinolone-2, N-ethyl-3-oxy-7-methyl- or N-β-cyanoethyl-1,2,3,4-tetrahydroquinoline or pyrimidines, e.g. barbituric acid, also 1,3-indandione, 1,8-naphthindadione, dimedone, acetoaceticaniline, m-hydroxy-N,N-diethyl-aniline, 3-hydroxy-4'-methyldiphenylamine, hydroquinone-monomethylether, acetylacetone, 5-hydroxy-benzthiazole and 1,2-diphenyl-pyrazolin-3,5-dione.

The coupling can also be carried out in known manner, preferably in acid medium, optionally in the presence of sodium acetate or similar buffer substances or catalysts which influence the rate of coupling, e.g. dimethyl formamide, pyridine, or its salts.

The styryl dyestuffs according to the invention can be manufactured by reacting an aldehyde of the formula

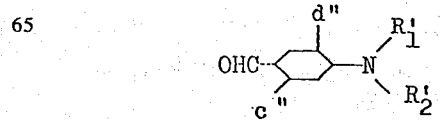

wherein d'', c'', R'₁ and R'₂ have the meanings given hereinbefore, with a cyano compound of the formula NC — CH₂ — Y, in which Y has the same meanings as hereinbefore, with the application of heat in the presence of a basic catalyst, for example ammonia, dimethylamine, diethylamine, piperidine, piperidine acetate, sodium or potassium alcoholate, optionally in the presence of a solvent, e.g. methanol, ethanol, benzene, toluene, xylene, chloroform, or carbon tetrachloride.

Examples of suitable cyano compounds of the formula NC—CH₂—Y are
malonic acid dinitrile
methyl cyanoacetate
ethyl cyanoacetate
butyl cyanoacetate
cyanacetamide
cyanoacetmethylamide
cyanacetdimethylamide
methylsulphonylacetonitrile
phenylsulphonylacetonitrile.

By using solvents it is possible to remove continuously from the reaction mixture the water that forms during the reaction by means of azeotropic distillation, whereby the reaction equilibrium is constantly displaced in favour of the condensation product. The condensation can also be effected without a basic catalyst in glacial acetic acid or in another organic acid or in the absence of a solvent, by fusing together the reactants in the presence of a basic catalyst, for example ammonium acetate or piperidine acetate.

It is possible to use the above cited coupling component as starting products if they contain only hydrogen atoms, chlorine atoms, methoxy, and methyl groups in the aromatic nucleus.

As methylene active compounds of the formula NC—CH₂—Y it is also possible to use those of the formula

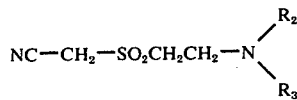

Anthraquinone dyestuffs according to the invention can be obtained, for example, from known water-insoluble anthraquinone dyestuffs containing hydroxyl or amino groups, by acylating these with sulphonic acid or carboxylic acid halides of the formula

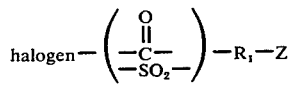

The derivatives of the formula

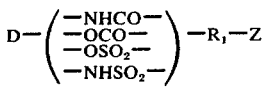

which are formed in the process are subsequently reacted with the amines

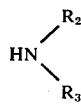

in the presence of acid acceptors. suitable acylating agents are, for example, β-chloropropionic acid chloride or β-chloroethanesulpho chloride.

Nitro dyestuffs can be manufactured by condensing an o-chloronitrobenzene of the formula

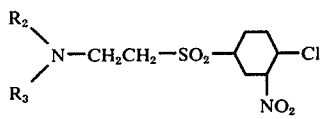

with an aniline which is optionally substituted at the aromatic nucleus.

The new dyestuffs are highly suitable for printing, and especially for dyeing, semisynthetic or, preferably, fully synthetic materials, in particular textile fibres.

As examples of substrates there may be cited materials such as polyacrylonitrile and copolymers from acrylonitrile and other vinyl compounds, e.g. acrylic esters, acrylic amides, vinyl pyridine, vinyl chloride, or vinylidene chloride, copolymers from dicyanoethylene and vinyl acetate, as well as from acrylonitrile block copolymers, polyurethanes, synthetic polyamides, e.g. poly(hexamethylene-adipic acid amide) or polyamide 66, poly(ω-caprolactam) or polyamide 6, poly(hexamethylene sebacid acid amide) or polyamide 610, and poly(11-aminoundecanoic acid) or polyamide 11, preferably cellulose-2½ acetate and, above all, aromatic polyesters, for example those from terephthalic acid and ethylene glycol or 1,4-dimethylolcyclohexane and copolymers from terephthalic and isophthalic acid with ethylene glycol and optionally, 1,4-dimethylolcyclohexane.

These materials can be in the most diverse forms of processing, for example filaments, woven knitted fabrics, yarns, or fibres.

These materials are dyed with the dyestuffs according to the invention under such conditions that the group of the formula

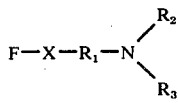

is split as follows

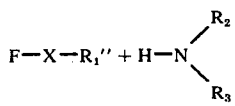

with the alkylene radical R₁ at the terminal ethylene group being deprotonised to the unsaturated group R''₁. If R₁ represents a —CH₂CH₂ group, then the splitting takes place as follows

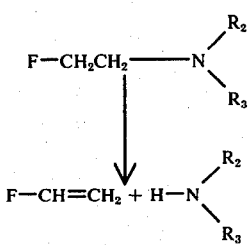

when a water-insoluble dyestuff is formed which becomes attached to the material as such.

This attachment is effected by dyeing the material at elevated temperature, for example at 80° to 130° C, optionally under pressure, in a weakly acid, neutral, or alkaline batch at a pH of about 3 to 10, preferably 4 to 7. Buffer systems, which contain e.g. phosphates or carboxylates, are optionally added to this dyebath.

The process possesses the advantage of being extraordinarily easy to operate. Both the dyeing and printing procedure can be performed by the conventional methods and, apart from the new dyestuff derivatives, no unusual substances, no very large amounts of adjuvants, and also no special apparatus are required.

Compared with the normal disperse dyeing, this process offers a number of decisive advantages which have been cited at the outset, namely that the dyestuffs do not have to be in the form of a dispersion and therefore the complicated grinding problems with disperse dyestuffs are dispensed with. Also no — mostly poisonous — dispersing agents are required that would pollute the effluent, and consequently too the troublesome foaming problems that arise in large-scale dyeing apparatus are eliminated.

The following Examples illustrate the invention, the parts and percantages being by weight unless otherwise stated, and the ratio of parts by weight to parts by volume being the same as that of the gram to the millilitre.

EXAMPLE 1

5.2 g of the dyestuff of the formula

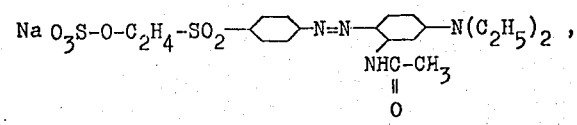

2.8 g of N-methyl taurine, and 4 g of tert. sodium phosphate are dissolved in 100 ml of water. The reaction mixture is stirred for 4 hours at 70° C and the resulting dyestuff of the formula

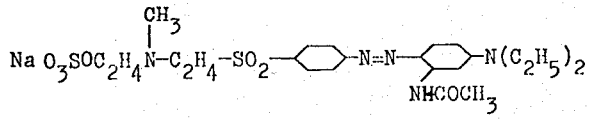

is isolated by salting it out with sodium chloride. It dissolves to give a clear solution in water, i.e. it does not have to be ground and dispersed and at pH 4 and 130° C produces on polyester fibres a brilliant orange red dyeing with good fastness to light, rubbing, perspiration and sublimation. The dyestuffs listed in the following-Tables 1, 2, and 3 are manufactured in analogous manner.

The dyestuff used as starting product was manufactured as follows: 10 g of 1-(β-hydroxyethylsulphonyl)-4-aminobenzene are given to 20 ml of concentrated sulphuric acid and the mixture is stirred for 16 hours at room temperature. It is then poured on ice, the sulphated amine is filtered off, and diazotisation is carried out by addition of 45 ml of normal sodium nitrite solution at 0°–5° C and after 1 hour the corresponding molar equivalent of 1-diethylamino-3-acetylaminobenzene is added. The batch is stirred for 2 hours at 10° C and the dyestuff is then precipitated.

EXAMPLE 2

40 g of β-hydroxyethyl-p-aminophenylsulphone are dissolved at 5°–15° C in 80 ml of concentrated sulphuric acid. The mixture is stirred briefly, then poured on 400 g of ice, when the sulphated hydroxyethyl-p-aminophenylsulphone is precipitated. This product is filtered, washed with ice water, then suspended in 250 ml of water. The suspension is treated with 20 ml of conc. hydrochloric acid and diazotisation is carried out by adding 25 ml of 4 normal sodium nitrile solution at 0°–5° C. After 2 hours the diazo solution is made neutral to Congo red by addition of sodium acetate. To this diazo solution is then added a solution of 35 g of 1-phenyl-3-methyl-5-amino-pyrazole in 250 ml of 0.8 normal sodium hydroxide solution. In doing so, the temperature should not exceed 5° C. A pH of 7 is established by addition of sodium carbonate solution and kept for 7 hours. The resulting dyestuff of the formula

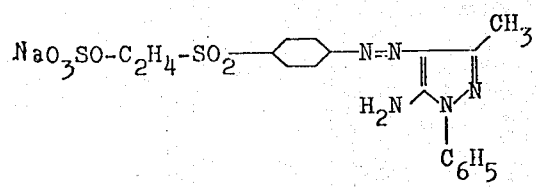

is then precipitated by addition of saturated sodium chloride solution, filtered, and dried.

Yield: 120 g.

4.88 g of this dyestuff are dissolved in 100 ml of water. To this solution are added 2.8 g of N-methyl taurine and 4 g of tertiary sodium phosphate and the solution is kept for 4 hours at 70° C. The resulting dyestuff of the formula

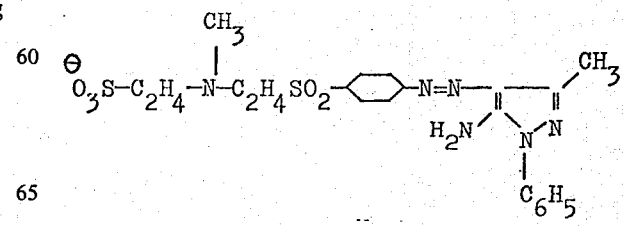

is then precipitated by addition of saturated sodium chloride solution, filtered, and dried in vacuo at 60°–70° C. At ph values between 4 and 7 and under elevated temperature conditions it dyes polyester in brilliant yellow shades. During the dyeing it is possible to dispense with a dispersing agent of any kind. The dyeings are distinguished by outstanding fastness to light, sublimation, rubbing and washing.

The dyestuffs listed in Tables 1, 2 and 3 can be obtained in analogous manner.

TABLE 1

$$R_3-\underset{\underset{R_2}{|}}{N}-C_2H_4-X-\underset{\underset{R_{11}}{|}}{\overset{\overset{R_{10}}{|}}{\bigcirc}}-N=N-\underset{\underset{R_{13}}{|}}{\overset{}{\underset{Y}{\bigcirc}}}R_{12}$$

| Nr. | $R_3$ | $R_2$ | $R_{10}$ | $R_{11}$ | X | Y | $R_{12}$ | $R_{13}$ | Shade |
|---|---|---|---|---|---|---|---|---|---|
| 1 | $HO_3S-CH_2CH_2-$ | $-CH_3$ | H | H | $-SO_2-$ | $-OH$ | $CH_3$ | $C_6H_5$ | yellow |
| 2 | $HO_3S-CH_2CH_2-$ | H | H | H | $-SO_2-$ | $-OH$ | $CH_3$ | $C_6H_5$ | '' |
| 3 | $HO_3S-(CH_2)_4-$ | $-CH_3$ | H | H | $-SO_2-$ | $-OH$ | $CH_3$ | $C_6H_5$ | '' |
| 4 | $HO_3S-(CH_2)_4-$ | $-C_2H_4OH$ | H | H | $-SO_2-$ | $-OH$ | $CH_3$ | $C_6H_5$ | '' |
| 5 | $H_2O_3PO-C_2H_4$ | H | H | H | $-SO_2-$ | $-OH$ | $CH_3$ | $C_6H_5$ | '' |
| 6 | $HO_2S(CH_2)_3-$ | $-CH_3$ | H | H | $-SO_2-$ | $-OH$ | $CH_3$ | $C_6H_5$ | '' |
| 7 | $HO_3S-CH_2-CH_2-$ | $-CH_3$ | H | H | $-SO_2-$ | $-OH$ | $CH_3$ | $p-CH_3-C_6H_5$ | '' |
| 8 | $HO_3S-CH_2-CH_2-$ | $-CH_3$ | H | H | $-SO_2-$ | $-OH$ | $CH_3$ | $m-Cl-C_6H_5$ | '' |
| 9 | $HO_3S-CH_2-CH_2-$ | $-CH_3$ | H | H | $-SO_2-$ | $-NH_2$ | $C_6H_5$ | $C_6H_5$ | greenish yellow |
| 10 | $HO_3SSCH_2CH_2-$ | $-CH_3$ | H | H | $-SO_2-$ | $-OH$ | $CH_3$ | $C_6H_5$ | yellow |
| 11 | $HO_3SCH_2CH_2-$ | $-CH_3$ | H | $NO_2$ | $-SO_2-$ | $-OH$ | $CH_3$ | $C_6H_5$ | reddish yellow |
| 12 | $HO_3SCH_2CH_2-$ | $-CH_3$ | H | H | $-OC(=O)-$ | $-OH$ | $CH_3$ | $C_2H_5OH$ | yellow |
| 13 | $HO_3SCH_2CH_2-$ | $-CH_3$ | H | H | $-OC(=O)-$ | $-OH$ | $OCH_3$ | $C_6H_5$ | '' |
| 14 | $HO_3SCH_2CH_2-$ | $-CH_3$ | H | H | $-OC(=O)-$ | $-OH$ | $CONH_2$ | $C_6H_5$ | '' |
| 15 | $HO_3SCH_2CH_2-$ | $-CH_3$ | Cl | Cl | $-N(C_2H_5)SO_2-$ | $-OH$ | $CH_3$ | $C_6H_5$ | reddish yellow |
| 16 | $HO_3SCH_2CH_2-$ | $-CH_3$ | H | H | $-C(=O)-$ | $-OH$ | $CH_3$ | $C_6H_5$ | yellow |
| 17 | $HO_3SCH_2CH_2-$ | $-CH_3$ | H | H | $-OSO_2-$ | $-OH$ | $CH_3$ | $C_6H_5$ | '' |

TABLE 2

$$R_3-\underset{\underset{R_2}{|}}{N}-C_2H_4X-\overset{5\ \ 6}{\underset{3\ \ 2}{\bigcirc}}\overset{4}{\phantom{-}}\overset{1}{\phantom{-}}N=N-B$$

(wherein B has the meaning given in page 7)

| Nr. | $R_3$ | $R_2$ | X | B | Shade |
|---|---|---|---|---|---|
| 1 | $HO_3SC_2H_4-$ | $CH_3$ | $4-SO_2-$ | 4-HO-phenyl-3-$CH_3$ | yellow |
| 2 | '' | '' | $4-C(=O)-HN$ | '' | '' |
| 3 | '' | '' | '' | 4-HO-phenyl-3-$C_2H_4CN$ | '' |
| 4 | '' | '' | '' | 4-HO-phenyl-3-$OCH_3$ | '' |

TABLE 2-continued $$R_3-N(R_2)-C_2H_4X-\underset{3\ 2}{\overset{5\ 6}{\underset{}{\bigcirc}}}^{4}_{1}-N=N-B$$

(wherein B has the meaning given in page 7)

| Nr. | R₃ | R₂ | X | B | Shade |
|---|---|---|---|---|---|
| 5 | " | " | " | (cyclohexyl with C₆H₅ and HO) | " |
| 6 | " | " | 4-SO₂NH— | (cyclohexyl with CH₃ and HO) | " |
| 7 | " | " | 4-C(O)—NH— | (ring with CH₃, CN, HO, N, OH) | " |
| 8 | " | " | 3-OSO₂— | " | " |

TABLE 3

$$R_3-N(R_2)-CH_2CH_2SO_2-\underset{R_{11}}{\overset{R_{10}}{\bigcirc}}-N=N-\underset{c}{\overset{d}{\bigcirc}}-N(R_1')(R_2')$$

| Nr. | R₃ | R₂ | R₁₀ | R₁₁ | c | d | R₁' | R₂' | Shade |
|---|---|---|---|---|---|---|---|---|---|
| 1 | HO₃SC₂H₄— | CH₃— | H | H | NHCOCH₃ | H | C₂H₄CN | C₂H₄OCOCH₃ | orange |
| 2 | " | " | CN | H | " | " | C₂H₅ | C₂H₅ | deep purplish red |
| 3 | " | " | Cl | H | H | " | C₂H₄CN | C₂H₄OH | orange |
| 4 | " | " | " | " | " | " | " | C₂H₅ | " |
| 5 | " | " | H | H | CH₃ | " | " | C₂H₄CN | " |
| 6 | " | " | Cl | " | H | " | C₂H₄OH | C₂H₄OH | " |
| 7 | " | " | Br | Br | CH₃ | " | C₂H₄CN | C₂H₅ | reddish yellow |
| 8 | " | " | H | H | NHCOCH₃ | " | C₂H₄OH | C₂H₄OH | orange |
| 9 | " | " | H | H | " | " | C₂H₄OCOCH₃ | C₂H₄OCOCH₃ | orange |
| 10 | " | " | " | " | " | OCH₃ | C₂H₅ | C₂H₅ | red |

EXAMPLE 3

A solution of 23.6 g of vinyl sulphone and 24.2 g of N-ethyl aniline in 100 ml of toluene is kept for 16 hours at 100° C. Then a solution of 40 g of N-methyl taurine and 12 g of sodium hydroxide solution in 250 ml of water is added and the two-phase mixture is stirred for 5 hours at 60°–65° C. The aqueous phase is then isolated. 34.6 g of o-chloro-p-nitro-aniline in 400 ml of normal hydrochloric acid are diazotised in the usual manner. To this diazo solution is added the previously prepared aqueous solution of the above obtained coupling component. The reaction mixture is made neutral to Congo red by addition of sodium acetate and is stirred overnight at 0°–10° C. The resulting dyestuff of the formula

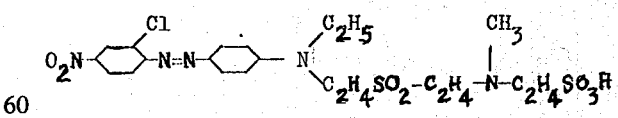

is precipitated by addition of a concentrated saline solution, filtered and dried at 40°–50° C in vacuo. It is readily soluble in hot water and at pH values between 4 and 7 dyes polyester fibres in yellowish red shades. The dyestuffs of Table 4 can be obtained in similar manner.

TABLE 4

$$D-N=N-\underset{c}{\overset{d}{\bigcirc}}-N\underset{R_2'}{\overset{R_1'}{\diagup}}-X-R_1-N\underset{R_3}{\overset{R_2}{\diagup}}$$

| Nr. | D | c | d | $R_1'$ | $R_2'$ |
|---|---|---|---|---|---|
| 1 | 2,4-dinitro-6-chlorphenyl | NHCOCH₃ | OCH₃ | CH₂C₆H₅ | —C₂H₄— |
| 2 | 2-cyano-4-nitrophenyl | H | H | C₂H₅ | " |
| 3 | 5-nitrothiazolyl | CH₃ | " | C₂H₅ | " |
| 4 | 6-methylsulphonylbenzthiazolyl | " | " | " | " |
| 5 | 4-nitrophenyl | NHCOCH₃ | H | C₂H₅ | " |
| 6 | 2-chloro-4-nitrophenyl | " | " | " | " |
| 7 | 2-cyano-4-nitrophenyl | H | H | C₂H₄CN | " |
| 8 | 2-chloro-4-nitrophenyl | " | " | " | " |
| 9 | 2-methylsulphonyl-4-nitrophenyl | " | " | " | " |
| 10 | 2,6-dichloro-4-nitrophenyl | " | " | " | " |
| 11 | " | " | " | C₂H₄CN | —C₂H₄OC₂H₄ |
| 12 | " | " | " | " | —C₃H₆— |
| 13 | 2-cyano-4-nitrophenyl | " | " | " | —C₂H₄— |
| 14 | " | " | " | C₂H₄CN | —CH₂—CH<br>\|<br>CH₂—OC₆H₅ |
| 15 | 2,4-dinitro-6-chlorophenyl | NHCOCH₃ | OC₂H₅ | " | —C₂H₄— |
| 16 | 2-amino-5-nitroisobenzthiazobyl | CH₃ | H | C₂H₅ | " |
| 17 | 2,6-dichloro-4-nitrophenyl- | H | " | " | " |
| 18 | 2-cyano-4-nitrophenyl- | " | " | " | —C₂H₄OC₂H₄— |

| Nr. | D | X | $R_1$ | $R_2$ | $R_3$ | Shade |
|---|---|---|---|---|---|---|
| 1 | 2,4-dinitro-6-chlorphenyl | —O—CO— | C₂H₄ | CH₃ | C₂H₄SO₃H | navy blue |
| 2 | 2-cyano-4-nitrophenyl | —SO₂— | " | " | " | bluish red |
| 3 | 5-nitrothiazolyl | " | " | " | " | violet |
| 4 | 6-methylsulphonylbenzthiazolyl | " | " | " | " | |
| 5 | 4-nitrophenyl | " | " | " | " | scarlet |
| 6 | 2-chloro-4-nitrophenyl | " | " | " | " | " |
| 7 | 2-cyano-4-nitrophenyl | —O—CO— | " | " | " | red |
| 8 | 2-chloro-4-nitrophenyl | " | " | " | " | red |
| 9 | 2-methylsulphonyl-4-nitrophenyl | " | " | " | " | yellowish red |
| 10 | 2,6-dichloro-4-nitrophenyl | " | " | " | " | brown |
| 11 | " | " | " | " | " | " |
| 12 | " | NH—CO— | " | " | " | " |
| 13 | 2-cyano-4-nitrophenyl | NH—SO₂ | " | " | " | bluish red |
| 14 | " | —OCO— | " | " | " | red |
| 15 | 2,4-dinitro-6-chlorophenyl | O—CO— | " | " | " | navy blue |
| 16 | 2-amino-5-nitroisobenzthiazobyl | —SO₂— | " | " | " | reddish blue |
| 17 | 2,6-dichloro-4-nitrophenyl- | " | " | " | " | brown |
| 18 | 2-cyano-4-nitrophenyl- | " | " | " | " | bluish red |

EXAMPLE 4

6 g of 2-bromo-4-nitro-6-cyano-aniline are suspended in a mixture of 60 ml of propionic acid and 20 ml of glacial acetic acid. The suspension is cooled to −15° C and at this temperature 4 ml of nitrosylsulphuric acid, corresponding to 1.8 g of sodium nitrite, are added dropwise within 1 hour. Then 9.1 g of the compound of the formula

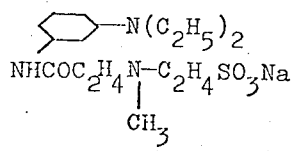

are slowly added at −5° C. The batch is stirred for 1 hour at this temperature and the precipitated dyestuff is then filtered off. It is dissolved once more in water with the addition of sodium carbonate, precipitated with saturated sodium chloride solution, filtered and dried in vacuo at 70° C. There are obtained 9 g of a dyestuff of the formula

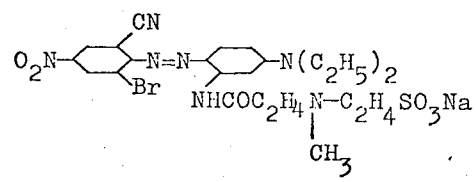

whose solubility in water is very good. A blue dyeing with outstanding fastness properties is obtained by dyeing polyester fibres with this product in a normal elevated temperature dyeing apparatus at 130° C and a pH of 5 and without the addition of a dispersing agent.

The aniline derivative used as coupling component is obtained as follows: 10.6 g of 3-(β-chloropropionylamino)-N,N-diethylaniline are stirred together with 11.5 g of N-methyl taurine and 6.7 g of sodium bicarbonate for 16 hours in a mixture of 150 ml of water and 50 ml of ethyl alcohol at 85° C. The solution is then extracted 3 times with 50 ml of benzene on each occasion. The aqueous phase is evaporated to dryness and the residue is extracted with methanol. The methanol is evaporated to give 17 g of the compound of the formula

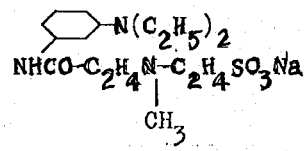

The dyestuffs of the Table 5 is obtained in analogous manner.

and 1.7 g of sodium bicarbonate are suspended in 100 ml of acetone and acylated at room temperature with 2 g of 3-chloropropionyl chloride. The mixture is stirred overnight, then a solution of 2.8 g of N-methyl taurine and 3.3 g of Na$_3$PO$_4$ in 150 ml of H$_2$O is added and the batch is boiled under reflux until complete reaction has taken place. The solvent is then distilled off, the dyestuff salted out and filtered off. There are obtained 5 g of the dyestuff of the formula

TABLE 5

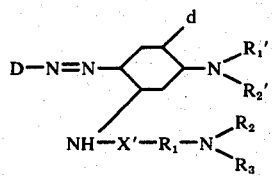

| Nr. | D | d | R$_1$' | R$_2$' |
|---|---|---|---|---|
| 1 | 2,4 dinitro-6-chlorophenyl | OCH$_3$ | CH$_2$—C$_6$H$_5$ | CH$_2$—C$_6$H$_5$ |
| 2 | 4-Nitrophenyl | H | C$_2$H$_5$ | C$_2$H$_5$ |
| 3 | 2,6-dicyano-4-nitrophenyl | " | " | " |
| 4 | 2-cyano-4-nitrophenyl | " | " | " |
| 5 | 2-chloro-5-methylsulphonylphenyl | " | " | " |
| 6 | 4-nitrophenyl | " | C$_2$H$_4$—O—CO—CH$_3$ | C$_2$H$_4$—O—CO—CH$_3$ |
| 7 | " | " | C$_2$H$_4$OC$_2$H$_4$—CN | C$_2$H$_4$CN |
| 8 | 2,6-dichloro-4-nitrophenyl | " | C$_2$H$_4$CN | C$_2$H$_4$CN |
| 9 | 2-chloro-4-nitrophenyl | " | CH$_2$C$_6$H$_5$ | C$_2$H$_5$ |
| 10 | 2-cyano-4-nitrophenyl | " | C$_2$H$_5$ | C$_2$H$_5$ |
| 11 | " | OC$_2$H$_5$ | " | C$_2$H$_4$—O—CO—CH$_3$ |
| 12 | 2-cyano-4-nitro-6-bromophenyl | H | " | C$_2$H$_5$ |

| Nr. | D | X' | R$_1$ | R$_2$ | R$_3$ | Shade |
|---|---|---|---|---|---|---|
| 1 | 2,4 dinitro-6-chlorophenyl | —CO— | —C$_2$H$_4$— | CH$_3$ | CH$_2$CH$_2$SO$_3$H | navy blue |
| 2 | 4-Nitrophenyl | " | " | " | " | scarlet |
| 3 | 2,6-dicyano-4-nitrophenyl | " | " | " | " | blue |
| 4 | 2-cyano-4-nitrophenyl | " | " | " | " | deep purplish red |
| 5 | 2-chloro-5-methylsulphonylphenyl | " | " | " | " | orange |
| 6 | 4-nitrophenyl | " | " | " | " | scarlet |
| 7 | " | " | " | " | " | scarlet |
| 8 | 2,6-dichloro-4-nitrophenyl | " | " | " | " | brown |
| 9 | 2-chloro-4-nitrophenyl | " | " | " | " | red |
| 10 | 2-cyano-4-nitrophenyl | —SO$_2$— | " | " | " | bluish red |
| 11 | " | " | " | " | " | violet |
| 12 | 2-cyano-4-nitro-6-bromophenyl | " | " | " | " | violet |

EXAMPLE 5

3.7 g of the dyestuff of the formula

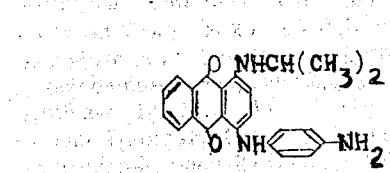

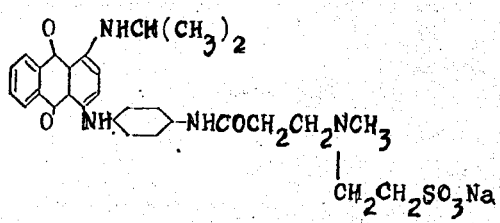

It dyes polyester fibres in blue shades from a batch containing no dispersing agents.

TABLE 6

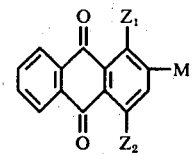

| Example | $Z_1$ | $Z_2$ | M | Shade on Polyester |
|---|---|---|---|---|
| 1 | —OH | —HN—⟨cyclohexyl⟩ | —CH$_2$OCOCH$_2$CH$_3$CH$_2$<br>               \|<br>H$_3$C—NCH$_2$CH$_2$SO$_3$H | violet |
| 2 | —OH | —NH—⟨cyclohexyl with OSO$_2$CH$_2$CH$_2$ / NCH$_2$CH$_2$ / SO$_3$CH$_3$⟩ | | violet |
| 3 | —NHCOCH$_2$CH$_2$<br>NCH$_2$CH$_2$—SO$_3$H | —NH$_2$ | H | red |
| 4 | —NH$_2$ | —OH | —O——OSO$_2$CH$_2$CH$_2$CH$_3$<br>H$_3$C—NHC$_2$H$_2$SO$_3$H | red |
| 5 | —NH$_2$ | —OH | —O——CH$_2$CH$_2$—O—C—CH$_2$CH$_2$NCH$_3$<br>        CH$_2$HO$_3$S—CH$_2$ | red |
| 6 | —NH$_2$ | —NHCOCH$_2$CH$_2$<br>NCH$_2$CH$_2$SO$_3$H<br>CH$_3$ | —Cl | bluish red |
| 7 | —NHCOCH$_2$CH$_2$<br>$_N$—CH$_2$CH$_2$SO$_3$H | ⟨Cl, NH—, Cl substituted cyclohexyl⟩ | —H | violet |
| 8 | —OH | —NH——NHCO<br>CH$_2$CH$_2$NCH$_3$<br>CH$_2$CH$_2$SO$_3$H | —H | reddish blue |
| 9 | —OH | —NH—⟨cyclohexyl⟩<br>NH—SO$_2$CH$_2$CH$_2$<br>CH$_3$<br>\|<br>NCH$_2$CH$_2$SO$_3$H | —H | reddish blue |
| 10 | —NH$_2$ | —NH$_2$ | —SO$_2$CH$_2$CH$_2$—N—C$_2$H$_4$SO$_3$H<br>                        \|<br>                        CH$_3$ | blue |
| 11 | " | —NH Phenyl | " | |
| 12 | —OH | —NH—⟨cyclohexyl with CH$_2$SO$_2$C$_2$H$_4$ / CH$_3$ / NC$_2$H$_4$SO$_3$H⟩<br>(Isomerengemisch) | —H | reddish blue |
| 13 | " | —NH—⟨cyclohexyl with SO$_2$C$_2$H$_4$ / CH$_3$ / —N—C$_2$H$_4$SO$_3$H⟩ | " | violet |

We claim:
1. A dyestuff of the formula

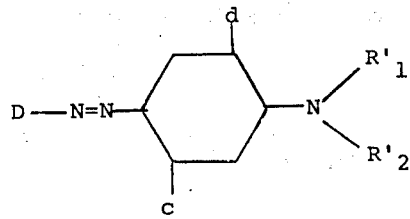

in which D is phenyl which is unsubstituted or substituted by chloro, bromo, nitro, cyano, thiocyano, trifluoromethyl, lower alkyl, lower alkoxy, phenoxy, lower alkylmercapto, loweralkoxycarbonyl, loweralkoxycarbonyloxy, loweralkoxysulphonyl, aminosulphonyloxy, aminocarbonyl, benzoyl, 4-chlorobenzoyl, 4-methylbenzoyl, benzenesulphonyl, acetyl, propionyl, chloroacetyl, methylsulphonyl, benzoylamino, 4-chlorobenzoylamino, 4-methylbenzoylamino, benzenesulphonylamino, acetylamino, propionylamino, chloroacetylamino, methylsulphonylamino; phenylazo which is unsubstituted or substituted by chloro, nitro lower alkyl, or lower alkoxy or

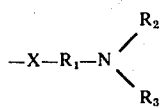

wherein, $R'_1$ and $R'_2$ are hydrogen, $C_1-C_4$-alkyl or $C_1-C_4$-alkyl substituted by chlorine, fluorine, bromine, cyano, cyanoethoxy, hydroxy, lower alkoxy, lower alkylcarbonyloxy, lower alkylcarbonylamino, benzoyloxy, benzoylamino, lower alkoxycarbonyloxy, phenoxycarbonyloxy, phenylaminocarbonyloxy, lower alkylaminocarbonyloxy, or

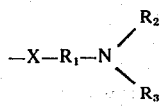

wherein X is —NH—CO—, —NH—SO$_2$—, —SO$_2$—, —CO—, —O—CO, —N(lower alkyl)—SO$_2$— or —N(lower alkyl)—CO—, $R_1$ is ethylene or 1,2-propylene, $R_2$ is hydrogen, $C_1-C_8$-alkyl or the same as $R_3$, $R_3$ is $C_1-C_5$—alkylene—O—SO$_3$H, $C_1-C_5$—alkylene—SO$_3$H, $C_1-C_5$—alkylene—O—PO$_3$H$_2$ and

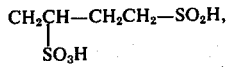

c and d are hydrogen, chlorine, lower alkoxy, lower alkyl, phenylthio, phenoxy and lower alkyloxycarbonyl, and c is also bromine, trifluoromethyl, acylamino and N-methyl acylamino wherein "acyl" is lower alkanoyl, lower alkoxycarbonyl, phenoxycarbonyl, lower alkylaminocarbonyl, phenylaminocarbonyl, —CO—R$_1$—NR$_2$R$_3$ and —SO$_2$—R$_1$—NR$_1$R$_2$, $R'_1$ and $R'_2$ each are $C_1-C_4$-alkyl and $C_1-C_4$-alkyl substituted by chlorine, bromine, cyano, cyanoethoxy, hydroxy, phenyl, lower alkoxy, lower alkylcarbonyloxy and

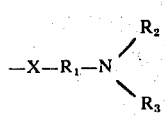

wherein

X is —SO$_2$—, —NH—SO$_2$— or —NH—CO—, and $R_1$ is ethylene or 1,2-propylene, $R_2$ is $C_1-C_4$—alkyl or the same as $R_3$, $R_3$ is $C_1-C_4$—alkylene—O—SO$_3$H, and $C_1-C_4$—alkylene—SO$_3$H, c and d are hydrogen, chlorine, lower alkoxy, lower alkyl, and c is also lower alkanoylamino and —HN—CO—R$_1$—NR$_2$R$_3$, and wherein at least one of the phenyl group D, A or $R'_1$ or $R'_2$ contains a group of the formula

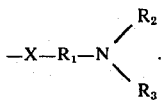

2. A dyestuff according to claim 1, wherein D corresponds to the formula

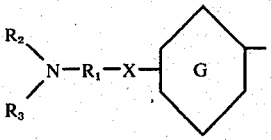

in which the phenyl ring G is unsubstituted or substituted by lower alkyl, lower alkoxy, lower alkoxycarbonyl, chloro, bromo, methylsulfonyl, nitro or cyano.

3. A dyestuff according to claim 1 wherein the group

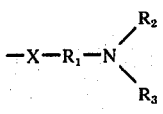

corresponds to the formula

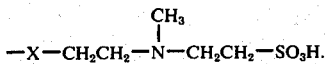

4. A dyestuff according to claim 3 wherein X is —HN—SO$_2$—, —HN—CO—, —O—CO—, —SO$_2$— or —CO—.

5. A dyesfuff of the formula

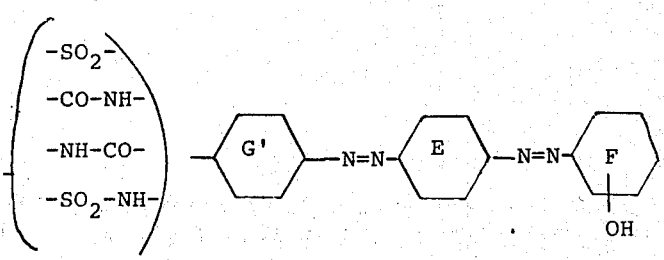

wherein the phenylene ring E is unsubstituted or substituted by lower alkyl, lower alkoxy or nitro, the phenyl ring F is further unsubstituted or substituted by lower alkyl or lower alkoxy, the phenylene ring G' is unsubstituted or substituted by lower alkyl, lower alkoxy, lower alkoxycarbonyl, chloro, bromo, nitro or cyano;

$R_1$ is ethylene or 1,2-propylene;

$R_2$ is hydrogen, $C_1$-$C_8$ alkyl or is the same as $R_3$; and $R_3$ is $C_1$-$C_5$—alkylene—O—$SO_3H$, $C_1$-$C_5$—alkylene—$SO_3H$, $C_1$-$C_5$—alkylene—O—$PO_3H_2$ or

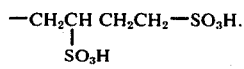

6. A dyestuff according to claim 1, of the formula

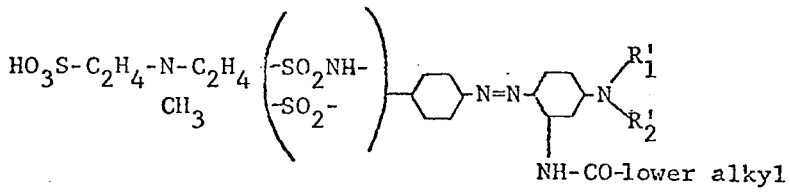

wherein $R'_1$ and $R'_2$ are the same or different and are lower alkyl, phenylethyl, benzyl, cyanoethyl, lower alkylcarbonyloxy-lower alkyl, hydroxy-lower alkyl or cyanoethoxyethyl.

7. A dyestuff according to claim 1, of the formula

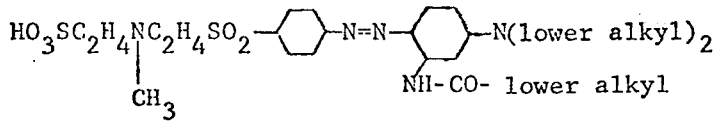

8. A dyestuff according to claim 1, of the formula

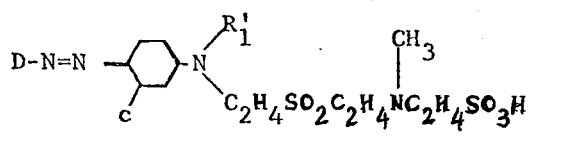

wherein $c$ represents hydrogen or halogen.

9. A dyestuff according to claim 1, of the formula

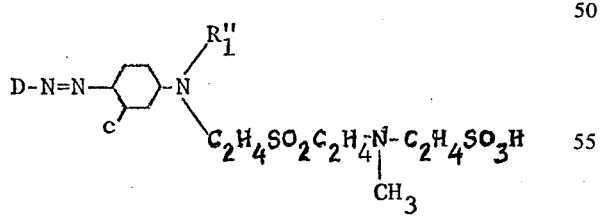

wherein $R''_1$ is lower alkyl, phenylethyl, benzyl, cyanoethyl, lower alkylcarbonyloxy-lower alkyl, hydroxy-lower alkyl, or cyanoethoxyethyl wherein $c$ represents hydrogen or methyl.

10. A dyestuff according to claim 9, wherein $R''_1$ is a lower alkyl group.

11. A dyestuff according to claim 10, wherein D is 2-cyano-4-nitro-phenyl, 2-chloro-4-nitrophenyl or 2,6-dichloro-4-nitrophenyl.

12. A dyestuff according to claim 1, of the formula

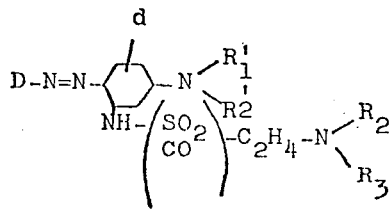

wherein $d$ is hydrogen or halogen, a lower alkyl, lower alkoxy, lower alkylmercapto, phenyl, phenoxy, phenylmercapto or lower alkoxycarbonyl.

13. A dyestuff according to claim 12, of the formula

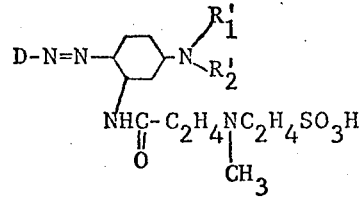

14. A dyestuff according to claim 13, of the formula

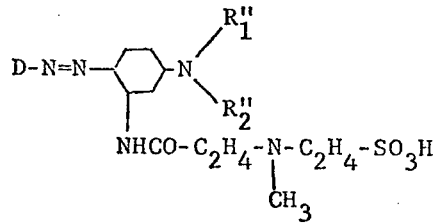

wherein $R''_1$ and $R''_2$ are the same or different and represent lower alkyl, phenylethyl, benzyl, cyanoethyl, hydroxy-lower alkyl, lower alkyloxycarbonyl-lower alkyl or cyanoethoxyethyl.

15. A dyestuff according to claim 14, of the formula

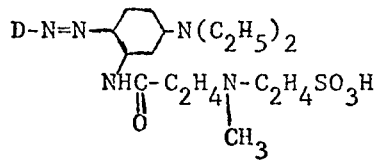

16. A dyestuff according to claim 15, wherein D is 2-chloro-4-nitrophenyl or 2-cyano-4-nitrophenyl.
17. A dyestuff according to claim 7 of the formula
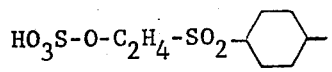
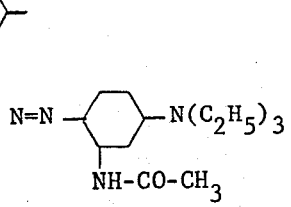
18. A dyestuff according to claim 9 of the formula
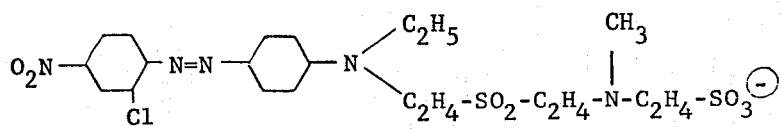
19. A dyestuff according to claim 15 of the formula
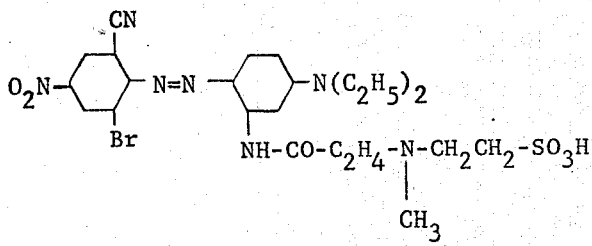
* * * * *

UNITED STATES PATENT OFFICE
CERTIFICATE OF CORRECTION

PATENT NO. : 3,987,026
DATED : October 19, 1976
INVENTOR(S) : STEFAN KOLLER ET AL.

It is certified that error appears in the above-identified patent and that said Letters Patent are hereby corrected as shown below:

Col. 39, claim 8, line 47, after "halogen" insert -- or lower alkanoylamino --.

Signed and Sealed this

Fourth Day of January 1977

[SEAL]

Attest:

RUTH C. MASON
*Attesting Officer*

C. MARSHALL DANN
*Commissioner of Patents and Trademarks*